United States Patent [19]

Geiger et al.

[11] 4,344,397

[45] Aug. 17, 1982

[54] METHOD FOR OPERATION OF A SPARK-IGNITED INTERNAL COMBUSTION ENGINE AND ARRANGEMENT FOR EXECUTION OF THE METHOD

[75] Inventors: Istvan Geiger, Muhlenring; Heinz Theuerkauf, AM Sundern, both of Fed. Rep. of Germany

[73] Assignee: Volkswagenwerk Aktiengesellschaft, Wolfsburg, Fed. Rep. of Germany

[21] Appl. No.: 146,075

[22] Filed: May 2, 1980

[30] Foreign Application Priority Data

May 5, 1979 [DE] Fed. Rep. of Germany ....... 2918135

[51] Int. Cl.³ .......................... F02P 5/04; F02D 11/10
[52] U.S. Cl. .................................... 123/339; 123/418; 123/352
[58] Field of Search ............... 123/339, 340, 344, 418, 123/420, 352

[56] References Cited

U.S. PATENT DOCUMENTS

| 3,320,770 | 5/1967 | Bevacqua | 123/420 |
|---|---|---|---|
| 3,482,559 | 12/1969 | Salomon | 123/420 |
| 3,577,963 | 5/1971 | Bechmann | 123/420 |
| 3,621,824 | 11/1971 | Burnia et al. | 123/339 |
| 3,964,457 | 6/1976 | Coscia | 123/339 |
| 4,111,174 | 9/1978 | Fitzner | 123/602 |
| 4,144,853 | 3/1979 | Maruoka | 123/339 |

FOREIGN PATENT DOCUMENTS 2221354  11/1973  Fed. Rep. of Germany ...... 123/339

OTHER PUBLICATIONS

"Internal Combustion Engines" by E. F. Obert, 1968, by International Textbook Inc.

Primary Examiner—Ronald B. Cox
Attorney, Agent, or Firm—Brumbaugh, Graves, Donohue & Raymond

[57] ABSTRACT

Engine idle speed is stabilized by a successive three stage control system which sequentially regulates ignition timing, fuel quantity and air throughput volume.

12 Claims, 5 Drawing Figures

METHOD FOR OPERATION OF A SPARK-IGNITED INTERNAL COMBUSTION ENGINE AND ARRANGEMENT FOR EXECUTION OF THE METHOD

BACKGROUND OF THE INVENTION

The present invention relates to methods and apparatus for stabilizing the idle speed of spark ignited internal combustion engine.

Prior U.S. Pat. application Ser. No. 044,328 filed May 31, 1979 discloses a method and apparatus for regulating idle speed of a spark ignited internal combustion engine by control of the ignition timing. In particular, the engine therein described is provided with a lean fuel-air mixture, to favorably influence the engine exhaust emission. The loss in the engine torque attributable to the lean mixture is recovered by providing a relatively high air throughout volume. The nominal ignition timing is relatively retarded, and the timing is advanced by a control circuit to stabillize the engine idling speed at a speed which approximates a desired value.

In German patent disclosure No. 2,221,354 there is described another method for stabilizing idle speed upon the occurrence of changes in engine load. In accordance with the disclosure, the ignition timing is advanced to compensate for increased engine load. Also, in order to compensate for the loss in output which results from a nominal retarded ignition timing, the volume of the mixture charge is increased.

German disclosure No. 2,725,460 discloses a governor wherein the volume of mixture provided to the engine is controlled in order to compensate for changes in engine load. A similar control is described in German disclosure No. 2,756,704. That document describes a system for control of air supply as a function of intake vacuum. Idling speed is increased during starting and warmup by an electrically generated control signal.

German disclosure No. 2,715,408 describes an idling speed governor wherein changes in load are compensated by changes in the volume of fuel supplied to the engine.

A characteristic of all of these prior art systems is that speed stabilization is obtained through variation of only a single engine control parameter. Consequently, the parameter must be varied over a range which is large enough to result in poor engine operation for some engine load conditions, or alternatively, full engine speed stabilization cannot be achieved. It is, therefore, an object of the present invention to provide a new and improved method and apparatus for controlling the idle speed of an internal combustion engine.

It is a further object of the invention to provide such an apparatus wherein such control parameter is varied over a predetermined selected range of values to ensure efficient and pollution free operation of the engine.

SUMMARY OF THE INVENTION

In accordance with the invention there is provided a method for operating a spark ignited internal combustion engine to stabilize the actual idle speed to be approximately eqyal to a desired idle speed. In accordance with the invention the engine is supplied with a lean fuel air mixture which has a high air ratio, exceeding the air-ratio corresponding to maximum mean indicated pressure. The ignition timing is controlled within a pair of selected timing limits to bring the actual idle speed toward the desired idle speed. The air ratio of the mixture is also controlled to bring the actual idle speed toward the desired idle speed.

In one embodiment, the air-ratio control is initiated only when the ignition timing reaches one of the limits. In another embodiment the air-ratio control is initiated after an extended time deviation of the actual idle speed from the desired idle speed.

According to the invention there is also provided an apparatus for stabilizing the idle speed of a spark ignited internal combustion engine having control signal operated adjustable ingition timing means and fuel metering means. The apparatus includes a first control device which responds to a first speed signal representing actual engine speed and a second speed signal representing desired engine speed. The first control device generates an ignition timing control signal for operation of the timing means, and for controlling the timing according to the difference between the first and second speed signals within the selected timing limits. There is also provided a second integrating control device, which responds to the timing control signal and the attainment of the timing limits for generating a fuel metering control signal for controlling the fuel metering means to change the air ratio of the mixture supplied to the engine.

In another embodiment the second integrating control device responds directly to the difference between the first and second speed signals, integrating the difference over time to generate a slowly changing fuel metering control signal.

In a preferred embodiment there may be provided a third control device, which responds to the output of the second control device for generating an air volume control signal, which regulates the volume of air supplied to the engine. It is possible to vary nominal values for engine speed, ignition timing, air ratio and air volume according to the actual operating temperature of the engine.

The method in accordance with the invention provides initially for a rapid regulation of the idling speed toward the nominal speed by modification of the ignition angle, i.e., in case of a sped decrease by adjusting the ignition in the direction toward an advance. In the event that the actual idling speed deviates from the desired speed over an extended period or, in the event that on modification of the ignition angle, the predetermined limit values thereof should be attained, a modification of the air ratio will occur for further stabilization of the idling speed. This modification of the air ratio may be subdivided, first, into a modification of the fuel quantity, and second a modification of the air volume supplied. The second "stage", modification of the air volume is initiated through the attainment of predetermined limit values for the modification of the delivered fuel quantity. A rapid response of the control is obtained due to the modification of the ignition angle which becomes effective very rapidly, namely, practically with the next-following ignition pulse. The modification of the air ratio becomes effective less rapidly and provides long-term stabilization so that variation of the ignition angle constituting the first stage remains available for regulating short-term and limited changes in the idling speed.

For a better understanding of the present invention, together with other and further objects, reference is made to the following description taken in conjunction with the accompanying drawings, and its scope will be pointed out in the appended claims.

DESCRIPTION OF THE INVENTION

Two examples of arrangements for carrying out the method in accordance with the invention will be described with reference to the functional block diagrams of FIGS. 1 and 2 and the graphs of FIGS. 3, 4 and 5. The diagrams in FIG. 3 refer to idling stabilization solely through adjustment of the ignition timing which is, the first state of the stabilization method of the present invention and which hereinafter is also designated as digital idling stabilization (DIS). FIG. 4 represents the corresponding diagrams for engine operation according to a method wherein, in addition to DIS there is provided, for speed stabilization, an adjustment of the air ratio through change of the fuel quantity delivered. This stage of adjustment is hereinafter designated as digital idling enrichment (die). In particular, air ratio adjustment serves to ensure, during cold start and warming up the engine an increased mean indicated pressure in the combustion chambers, which yields a higher torque. The higher torque is needed to overcome the higher friction of the engine under cold operating conditions. FIG. 5 contains similar graphs as FIGS. 3 and 4, for engine operation in which, in addition to the adjustment of the ignition timing and air ratio, there is also provided an adjustment of the air quantity delivered to the engine. This third stage of the method in accordane with the invention, on which the examples of embodiments illustrated are based, is designated hereinafter as digital airflow enhancement (DAE).

Figure 1:
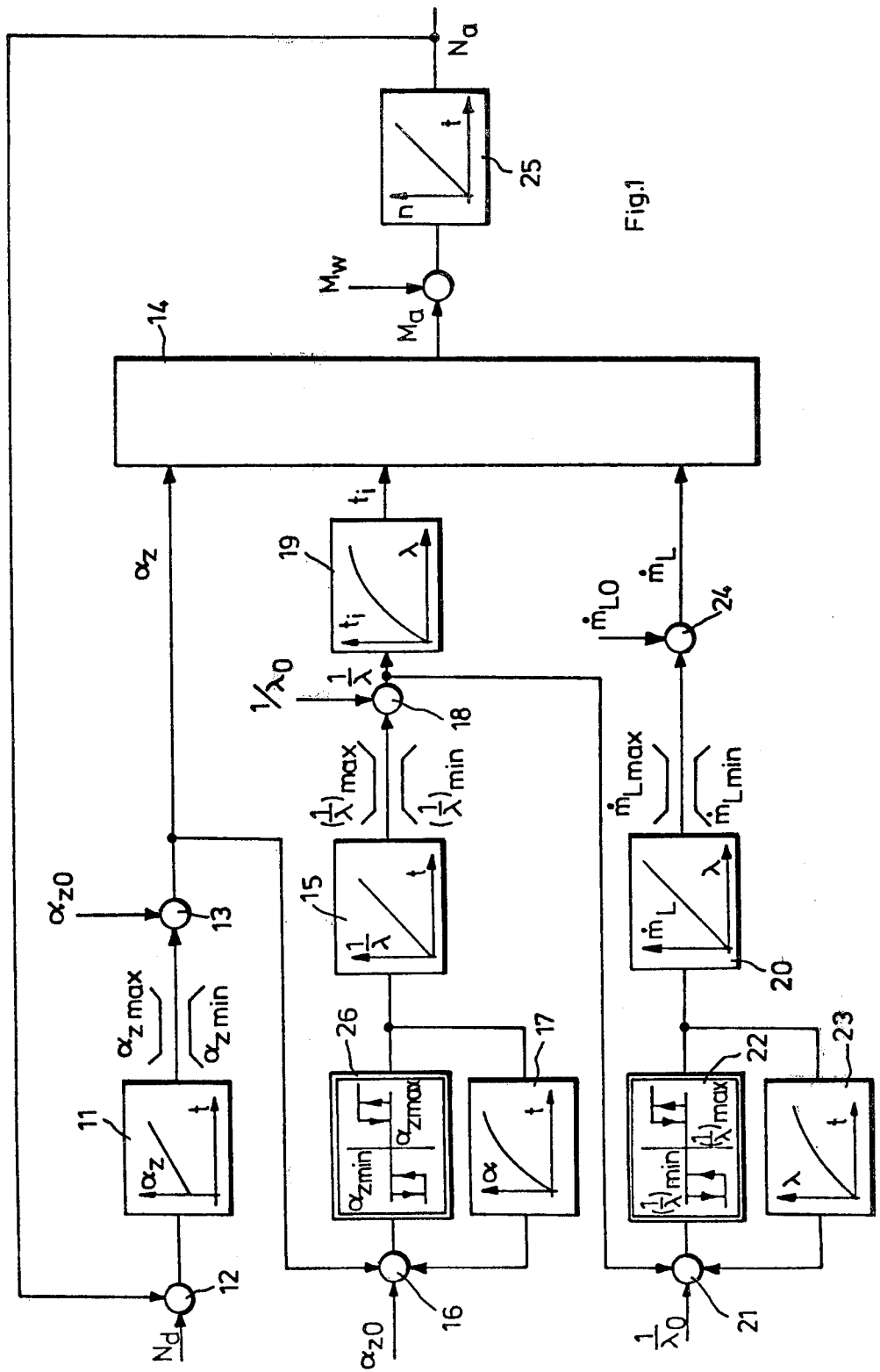
FIG. 1 is a functional block diagram illustrating the apparatus of the present invention.

Referring to FIG. 1, there is shown a block diagram of a control circuit according to the present invention. In the FIG. 1 circuit signals representing the actual engine speed $N_a$ and the desired idle speed $N_d$ are provided to a comparison circuit 12, which provides an output representing the deviation of the actual idle speed $N_a$ from the desired idle speed $N_d$. This deviation signal is provided to a first control device 11 which acts as linear-integrating circuit and provides an output representing ignition timing advance $\alpha_z$ which is time-dependent. Thus, the first controller 11 converts the idling speed deviation or error signal into adjustment of the ignition timing within an ignition timing range which is defined by two ignition timing limit values $\alpha_z$ max and $\alpha_z$ min. These limit values are selected to have values which ensure that timing variation is not great enough to impair engine operation. Thus, they constitute ignition timing operating limits.

The starting value $\alpha_{zO}$ of the ignition timing, which is a pre-selected nominal value, is within the timing range defined by the limit values so that it is possible to make adjustments to the ignition timing towards an advance and towards a delay.

The corresponding nominal values $\lambda_O$ and $m_{LO}$ for air ratio and air volume in the two further stages of the arrangement have been selected in accordance with these considerations.

The ignition timing starting value $\alpha_{zO}$ is delivered to a combining circuit 13 which, depending on the output signals of the first controller 11 proper, delivers adjustment signals for setting the ignition timing $\alpha_z$ needed to stabilize the idling speed, to an ignition timing adjusting device in the internal combustion engine 14. Devices of this kind are known in themselves and therefore need not be described here.

The output signals of the combining circuit 13 and the nominal value $\alpha_{zO}$ of the timing advance are provided to the combining circuit 16 and the input of the second control device 15. At the input to second control device 15 there are connected in parallel, for improvement of the regulation dynamics, the three-state threshold circuit 26 with hysteresis characteristics and the delay element 17. Delay element 17 is connected as a feedback around theshold circuit 26 to form a pulse-width modulator.

Deviations from regulation of the idling speed are counteracted initially by adjustment of the ignition timing. Should this not be sufficient, that is, should such large adjustment of the ignition timing be required that the timing reaches one of the limit values, further control of the idling speed is achieved by adjustment of the fuel quantity delivered. In the FIG. 1 embodiment, the fuel quantity adjustment is obtained through changing the length $t_i$ of fuel injection pulses. Thereby there is delivered via the second control device 15, which in this case is designed for a selected characteristic of the reciprocal value $1/\lambda$ of the air ratio plotted against the time t, the prescribed value is supplied (in form of a correction value) to the succeeding air ratio control circuit 19. Here again a maximal and a minimal threshold value each are provided for the inverse air ratio. Moreover, a nominal value $1/\lambda$ for the inverse air ratio is supplied to combining circuit 18, which generates an error for the air ratio. The air ratio control circuit 19, to which this error signal is delivered, supplies a signal determining the injection time $t_i$ to the fuel metering device in the internal combustion engine 14. In the example of the embodiment described, the said metering device is the customary fuel injection means. As a matter of principle, it may, of course, also be a carburetor.

As indicated above, the air ratio range has selected values. In the event that further modification of the air ratio should become necessary, namely in the sense of an alternate regulation due to attainment of one of the limit values of the reciprocal value of the air ratio, the control device 20 is actuated by way of the combining circuit 21. Threshold circuit 22 and delay element 23, which operate similar to corroponding circuit 16, 26 and 17. Control device 20 provide a control signal which adjusts the air volume $\dot{m}_L$, within a range defined by the limit values $\dot{m}_L$ max and $\dot{m}_L$ min, as a function of the set air ratio $\lambda$ or its reciprocal value. The output signal for the air volume, which determines the air volume $\dot{m}_L$ and which is obtained in the combining circuit 24 through comparison with the initial value $\dot{m}_{LO}$ of the air volume, is delivered to a flap or a valve in the suction system of the internal combustion engine, for example, the throttle valve in the customary intake pipe, or an additional intake air valve.

Thus, as soon as due to an outside moment $M_w$ (resistance moment) during idling. There is a decrease of the actual value $N_a$ of the speed of the internal combustion engine, in accordance with its time behavior 25. The control apparatus of FIG. 1 will act in three stages of adjustment to cause an increase in the mean pressure $p_{mi}$ in the combustion spaces of the internal combustion engine, which will increase the torque $M_a$ produced by the engine to compensate for the disturbance moment $M_w$.

In a preferred embodiment, engine temperature can be taken into account by selecting the values of nominal idle speed $N_d$, nominal ignition timing $\alpha_{zo}$, nominal air ratio $\lambda_o$ and nominal air volume $\dot{m}_{LO}$. These values can be selected according to the sampled temperature of the engine oil or water from a programmed memory or the like. The combining circuits 12, 13, 16, 18, 21 and 24 are thus provided with temperature-dependent rather than constant nominal values, so that as a result, a speed-controlled warming-up system is obtained.

Figure 2:
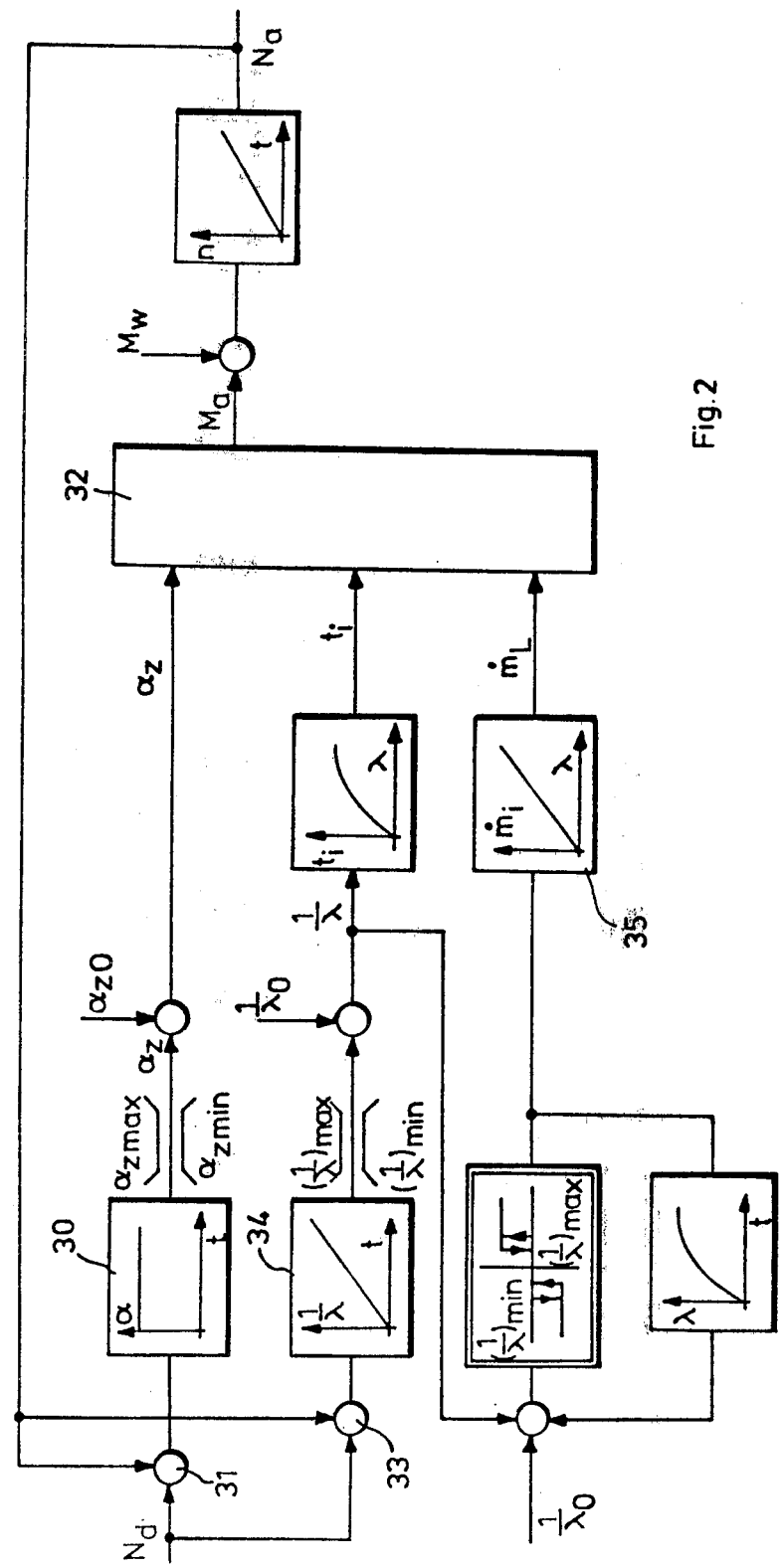
FIG. 2 is a functional block diagram of an alternate embodiment of the present invention.

Analogous considerations also apply to the embodiment shown in FIG. 2. Here, again we find a control device 30, which, in this embodiment is a linear controller, and which is associated with a combining circuit 31 forming the difference between the nominal engine speed $N_d$ and the actual engine speed $N_a$. This first control device 30 thus serves to deliver to the internal combustion engine 32 an error signal for adjustment of an ignition timing $\alpha_z$. Thus the control circuit responds to a lower engine speed caused by an addition moment $M_w$ by an increase in the ignition timing advance, which increases mean indicated pressure and output torque.

In the FIG. 2 embodiment, the idling speed error signal is delivered by way of the further combining circuit 33 to the second control device 34, which is an integral controller and becomes practically effective only after a given period of time has lapsed. Thus, there occurs here a partial overlap of the operation of the control devices 30 and 34. In the event that in spite of the (rapid) operation of the controller 30, the idle speed deviation should continue for an extended period of time, the (slower) second control circuit 34 becomes effective and causes a modification of the injection timing $t_i$ and thereby a corresponding modification of the fuel quantity delivered and the air ratio. As in the example of the embodiment shown in FIG. 1, the modification range of the air ratio and, respectively, its reciprocal value $1/\lambda$ is limited by predetermined limit values, and as soon as one of these limit values is attained, the control circuit containing the adjustment drive 35 in addition to the enabling circuit and delay elements becomes effective and brings about a change of the air throughout volume in a manner already described. Thus, a three-stage control is achieved by variation in succeeding the stages of the ignition timing, air ratio and air throughout volume.

Figure 3:
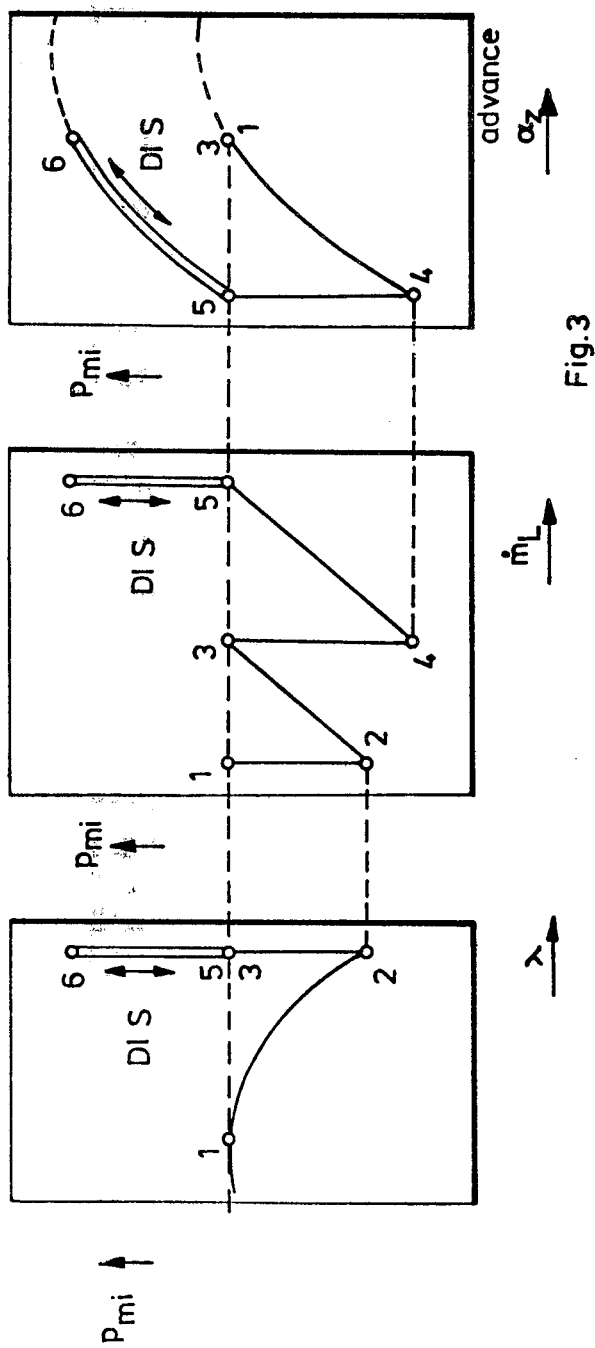
FIGS. 3, 4 and 5 are graphs plotting mean indicated pressure as functions of air ratio, air volume, and ignition timing for various engine operating conditions.
Figure 4:
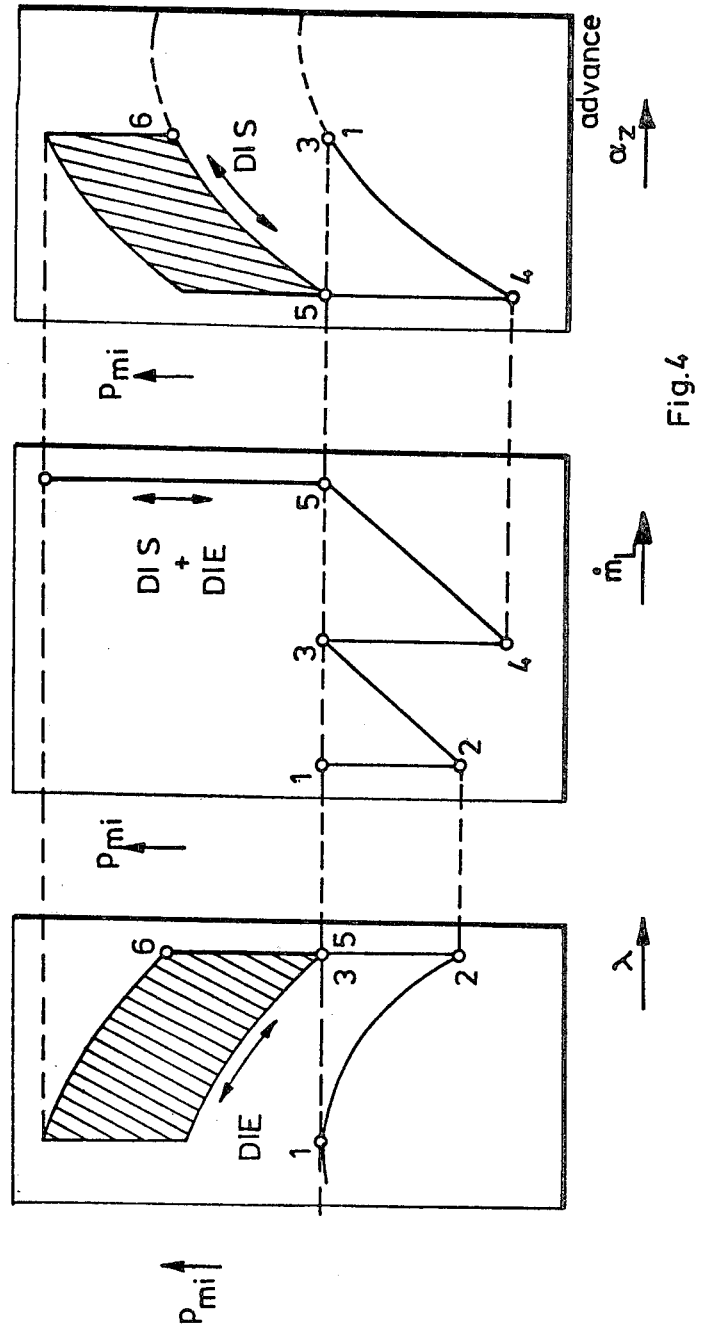
Figure 5:
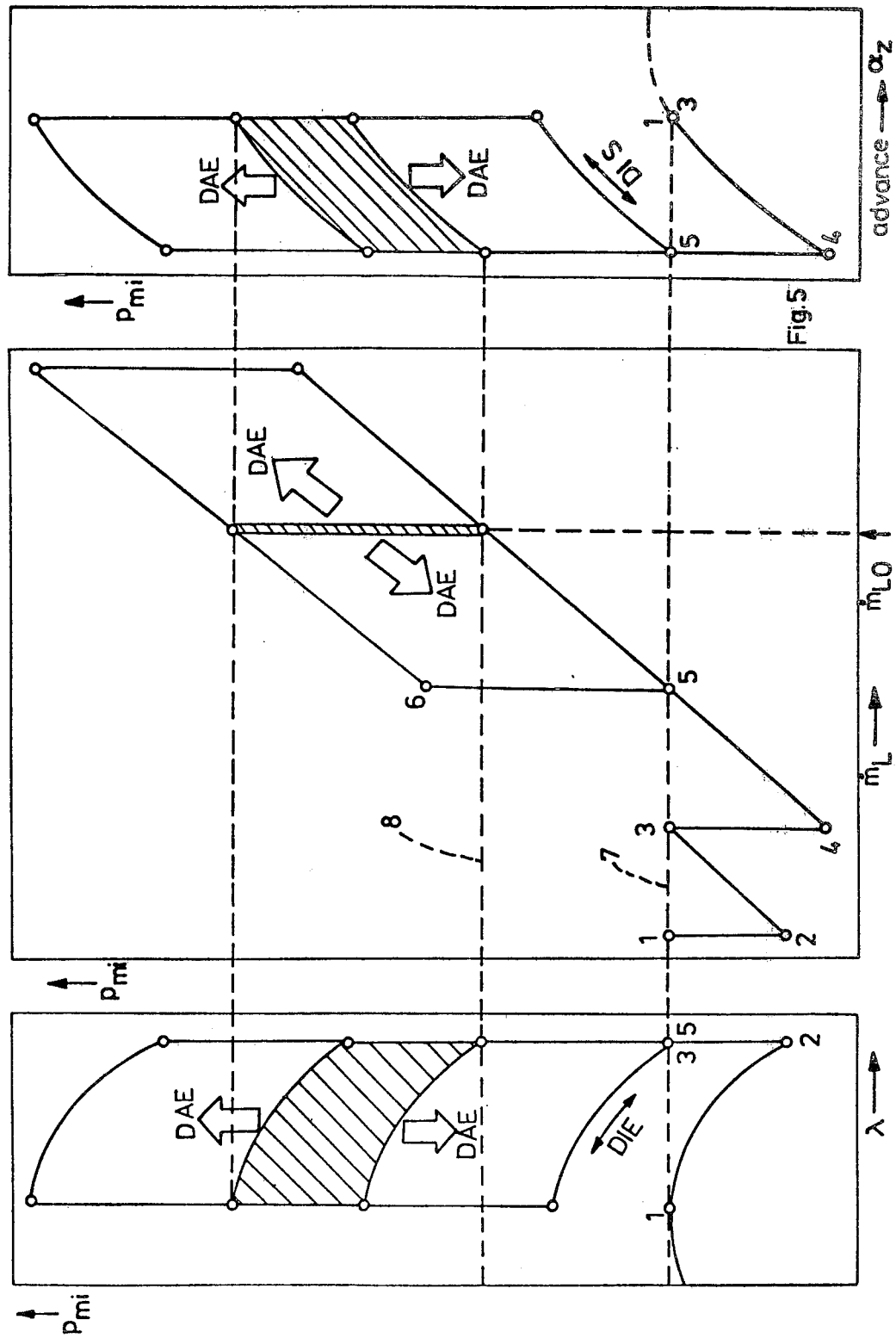

For a further understanding of the functioning of the invention, reference is made to the graphs in FIGS. 3, 4 and 5. In each figure the diagram to the left shows the mean indicated pressure $p_{mi}$ in the combustion chambers of the internal combustion engine as a function of the air ratio $\lambda$. The middle diagram of each figure shows the dependence of the mean indicated pressure upon the air throughout $\dot{m}_L$. The diagram to the right in each figure shows the correlation between the mean indicated pressure and the ignition timing advance $a_z$. I all cases idling is assumed.

The working point 1 of the engine shows the currently customary idling adjustment with a rich mixture and relatively small air throughput. The disadvantage of such adjustments consists in high CO and HC emissions in the exhaust gas. For this reason, and also for reasons of control engineering, the method in accordance with the invention departs from a working point 2 of the internal combustion engine on the downward sloping branch of the air ratio diagram appearing on the left side in the figures, that is, from a lean mixture control. Because of the lean mixture the mean pressure $p_{mi}$ and thereby the torque delivered during idling by the engine drop, the air throughout $\dot{m}_L$ must be increased so that the working point 3 in the diagrams is attained. Control difficulties now arise if the ignition timing setting is selected in the customary manner in accordance with point 3, as indicated in the right-hand diagrams. This ignition angle is so close to the maximum of the indicated mean pressure that an advance of the ignition point would hardly increase the mean pressure. Thus, in order to obtain an improved range of ignition timing control, the nominal setting of the ignition timing is moved to point 4, that is, the ignition is considerably retarded, and the loss in indicated mean pressure resulting therefrom is compensated by a further enlargement of the air throughput to point 5.

When the engine is warm, stabilization of the idling speed can be achieved by adjustment of the ignition timing within the range designated by points 5 and 6. This range is therefore characterized by "DIS" (digital idling stabilization).

FIG. 4 is based on FIG. 3 and concerns the case of creating a deviation of the idling speed due to low engine temperature, such as present during warming up. In this case, a wider margin from the lean operating limit must be ensured through enrichment of the mixture. Therefore, there is provided in addition to the speed control through change of the ignition angle DIS, an increase of the fuel quantity, that is, DIE (digital idling enrichment). The advantage of such a regulation in comparison with a general mixture enrichment during idling may be found in the fact that a mixture enrichment occurs only if a drop in speed actually signals a need for increased fuel delivery.

Whereas the starting point for a DIS is a change in the right-hand diagram of FIGS. 3, 4 and 5, an increase of the indicated mean pressure $p_{mi}$ occurs with DIE through decrease of the air ratio $\lambda$, so that each of the left diagrams forms the starting point. Thus the control characteristic of the DIS is enlarged to the hatched area in the diagrams of FIGS. 4 and 5.

FIG. 5 shows the effect of all three steps of the method in accordance with the invention, namely, idling stabilization (DIS) through modification of the ignition angle, idling enrichment (DIE) through modification of the fuel quantity supplied and addition of air (DAE=digital air enhancement), i.e., a change of the air ratio through modification of the air throughput volume $\dot{m}_L$. As becomes clear from FIG. 5, there is thus obtained a larger control range for influencing the indicated mean pressure $p_{mi}$ without the attainment by the manipulated variable, namely the ignition angle, air ratio and air throughput of any values which would impair the operation of the engine.

In FIG. 5, line 7 shows the required minimum value of the mean indicated pressure when the engine is warm, whereas line 8 shows the corresponding minimum value when the engine temperature is lower. It is clear that shifting the ignition point alone in the direction towards an advance will not be sufficient to cover the mean pressure needed when the internal combustion engine is cold. As already explained with reference to FIG. 1, there can be obtained selected nominal values not only for the ignition angle, but also for the air ratio and the air throughput as a function of temperature, for example, by way of a memory circuit.

The invention offers a method for regulating undesirable idling speed changes, which result from either a change in the engine temperature or from outside moments such as accessories, without the need for the operating parameters of the engine to assume values which are critical for its operation. Application of the method in accordance with the invention is capable of simplifying the automatic starting mechanism customary for vehicle engines.

Those skilled in the art of control circuits will recognize that the control functions herein described can be achieved using various specific circuits. One approach is to use analog circuitry which directly uses signals with voltage proportional to the quantities represented. Another approach is to convert measured quantities, such as engine speed into digital signals and generate the needed control signals digitally using either discrete control elements or a programmed microprocessor. Hybrid arrangements using a combination of digital and analog techniques are also possible.

While there have been described what are believed to be the preferred embodiments of the invention, those skilled in the art will recognize that other and further modifications may be made thereto without departing from the spirit of the invention and it is intended to claim all such embodiments as fall within the true scope o the invention.

We claim:

1. A method for operating a spark-ignited internal combustion engine to stabilize the actual idle speed to be approximately equal to a desired idle speed, said method comprising:

supplying said engine with a lean fuel-air mixture having a high air ratio, exceeding the air ratio corresponding to maximum mean indicated pressure;

controlling the ignition timing of said engine within a pair of selected ignition timing limits to bring said actual idle speed toward said desired idle speed;

and initiating a controlling of said air ratio of said mixture only when said ignition timing attains one of said limits, to bring said actual idle speed toward said desired idle speed.

2. A method for operating a spark-ignited internal combustion engine to stabilize the actual idle speed to be approximately equal to a desired idle speed, said method comprising:

supplying said engine with a lean fuel-air mixture having a high air ratio, exceeding the air ratio corresponding to maximum mean indicated pressure;

controlling the ignition timing of said engine within a pair of selected ignition timing limits to bring said actual idle speed toward said desired idle speed;

and initiating controlling said air ratio of said mixture after an extended-time deviation of said actual idle speed from said desired idle speed to bring said actual idle speed toward said desired idle speed.

3. Apparatus for stabilizing the idle speed of a spark ignited internal combustion engine having control signal operated adjustable ignition timing means and fuel metering means, comprising: proportional action or proportional plus reset action a first control device responsive to a supplied first speed signal, representative of actual engine speed, and a supplied second speed signal, representative of desired engine speed, for generating an ignition timing control signal for operation of said timing means, said signal for controlling said timing according to the difference between said first and second speed signals within a pair of selected ignition timing limits;

and a second integral action control device, responsive to the attainment of said timing lights, and responsive to said timing control signal, for generating a fuel metering control signal for operating of said fuel metering means to change the air radio of the mixture supplied to said engine.

4. Apparatus for stabilizing the idle speed of a spark ignited internal combustion engine having control signal operated adjustable ignition timing means and fuel metering means, comprising:

a first proportional action control device, responsive to a supplied first speed signal, representative of actual engine speed, and a supplied second speed signal, representative of desired engine speed, for generating an ignition timing control signal for operation of said timing means, said signal for controlling said timing according to the difference between said first and second speed signals within a pair of selected ignition timing limits;

and a second integral action control device, responsive to the time integration of the difference between said first and second speed signals for generating a fuel metering control signal for operation of said fuel metering means.

5. A method as specified in claim 1 or 2 wherein said air ratio is controlled by controlling the quantity of fuel supplied to said engine to vary the air ratio within a pair of selected air ratio limit values.

6. A method as specified in claim 5 wherein upon attainment of one of said air ratio limit values by control of fuel quantity, the air volume supplied to said engine is varied.

7. Apparatus as specified in claim 3 wherein there is provided a delay element at the timing control signal input to said second control device.

8. Apparatus as specified in claim 3 or claim 7 wherein there is further provided a threshold circuit at the intput to said second control device, for enabling said second control device on the attainment of said timing limits, said threshold circuit having three output states and having hysteresis characteristics.

9. Apparatus as specified in claim 3 or claim 4, wherein said engine includes air volume control means, responsive to an air volume control signal, and wherein there is provided a third control device, responsive to an output of said second control device, for generating said air volume control signal.

10. Apparatus as specified in claim 9 wherein there is provided a time delay element at the input to said third control device.

11. Apparatus as specified in claim 9 wherein there is further provided a threshold circuit at the input to said third control device, for enabling said third control device on the attainment of selected limiting values of the output of said second control device, said threshold circuit having three output states and having hysteresis characteristics.

12. Apparatus as specified in claim 3 or claim 4 wherein there are provided means for generating said second speed signal and nominal values signals for air ratio and air volume, and wherein at least one of said speed signal and said nominal values signals is controlled as a function of engine temperature to provide greater mean indicated pressure when said engine is cold.

* * * * *